United States Patent
Yoshida et al.

(10) Patent No.: US 9,146,849 B2
(45) Date of Patent: Sep. 29, 2015

(54) APPARATUS AND METHOD FOR CONTROLLING POWER SUPPLY OF CONTROL DEVICE THAT CONTROLS ACCESS TO DATA

(71) Applicant: FUJITSU LIMITED, Kawasaki-shi, Kanagawa (JP)

(72) Inventors: Akimasa Yoshida, Nagoya (JP); Satoshi Taki, Nagoya (JP); Kenichi Fujita, Nagoya (JP); Chiaki Nagashima, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 13/904,190

(22) Filed: May 29, 2013

(65) Prior Publication Data

US 2014/0013064 A1 Jan. 9, 2014

(30) Foreign Application Priority Data

Jul. 3, 2012 (JP) .................................. 2012-149949

(51) Int. Cl.
*G06F 13/12* (2006.01)
*G06F 13/00* (2006.01)
*G06F 12/00* (2006.01)
*G06F 3/06* (2006.01)

(52) U.S. Cl.
CPC .............. *G06F 12/00* (2013.01); *G06F 3/067* (2013.01); *G06F 3/0625* (2013.01); *G06F 3/0634* (2013.01); *G06F 3/0689* (2013.01); *Y02B 60/1246* (2013.01)

(58) Field of Classification Search
None
See application file for complete search history.

(56) References Cited

U.S. PATENT DOCUMENTS

| 7,302,541 B2 * | 11/2007 | Hirezaki et al. ............... 711/165 |
| 8,639,956 B2 * | 1/2014 | Hildebrand .................... 713/320 |
| 2010/0083010 A1 * | 4/2010 | Kern et al. .................... 713/300 |
| 2011/0077795 A1 * | 3/2011 | VanGilder et al. ............ 700/300 |

FOREIGN PATENT DOCUMENTS

| JP | 10-177494 | 6/1998 |
| JP | 2010-146215 | 7/2010 |

* cited by examiner

*Primary Examiner* — Idriss N Alrobaye
*Assistant Examiner* — David Martinez
(74) *Attorney, Agent, or Firm* — Staas & Halsey LLP

(57) ABSTRACT

A control device, which controls access to the data stored in a memory device, includes a selector, a changing unit, a notification unit, and a power supply controller. When the number of accesses to a memory device is out of a range of a predetermined threshold, the selector selects a piece of data from pieces of data controlled by the control device itself or another control device. The changing unit changes a control device for controlling access to the selected a piece of data. The notification unit notifies an information processing device of a control device after changed and the selected a piece of data to be controlled by the control device after changed. The power supply controller controls a power supply of the control device after changed or a power supply of a control device that has controlled access to the selected a piece of data.

9 Claims, 11 Drawing Sheets

FIG.2

| LOGICAL VOLUME ID | PATH IP ADDRESS | PATH STATE |
|---|---|---|
| LOGICAL VOLUME A | 10.20.40.50 | ACTIVE |
| | 10.20.40.51 | STAND-BY |
| | 10.20.40.52 | STAND-BY |
| | 10.20.40.53 | OFF-LINE |
| LOGICAL VOLUME B | 10.20.40.50 | STAND-BY |
| | 10.20.40.51 | STAND-BY |
| | 10.20.40.52 | STAND-BY |
| | 10.20.40.53 | OFF-LINE |

| STORAGE CONTROLLER ID | STORAGE CONTROLLER STATE | ASSIGNED IP ADDRESS | ALLOCATED LOGICAL VOLUME ID |
|---|---|---|---|
| 1 | ACTIVE | 10.20.40.50 | LOGICAL VOLUME A, LOGICAL VOLUME D |
| 2 | ACTIVE | 10.20.40.51 | LOGICAL VOLUME B, LOGICAL VOLUME E |
| 3 | ACTIVE | 10.20.40.52 | LOGICAL VOLUME C, LOGICAL VOLUME F |
| 4 | STOP | 10.20.40.53 | – |

| LOGICAL VOLUME ID | LOGICAL VOLUME STATE | ALLOCATED STORAGE CONTROLLER ID | ASSIGNED JOB SERVER IP ADDRESS |
|---|---|---|---|
| LOGICAL VOLUME A | NORMAL | 1 | 10.20.30.40 |
| LOGICAL VOLUME B | DELETING | 2 | 10.20.30.40 |
| LOGICAL VOLUME C | CREATING | 3 | 10.20.30.40 |
| LOGICAL VOLUME D | NORMAL | 1 | 10.20.30.41 |
| LOGICAL VOLUME E | NORMAL | 2 | 10.20.30.41, 10.20.30.42 |

APPARATUS AND METHOD FOR CONTROLLING POWER SUPPLY OF CONTROL DEVICE THAT CONTROLS ACCESS TO DATA

CROSS-REFERENCE TO RELATED APPLICATION

This application is based upon and claims the benefit of priority of the prior Japanese Patent Application No. 2012-149949, filed on Jul. 3, 2012, the entire contents of which are incorporated herein by reference.

FIELD

The embodiments discussed herein are related to a control device, a storage device, and a control method performed by the control device.

BACKGROUND

In recent years, cluster storage devices have come into use. For example, one of the plurality of nodes of this type of storage devices that includes a disk device functions as a control node. When the control node receives an access request to data from a server, the control node specifies a node holding the requested data and notifies the server of it. This makes the server accessible to the node holding the target data.

Furthermore, known is a technique of transferring the function of the control node to another node depending on the load in the control node. For example, in the storage device, when the load on the control node is increased, a node with a low load is changed to be set as the control node (for example, see Japanese Laid-open Patent Publication No. 2010-146215).

Patent Document 1: Japanese Laid-open Patent Publication No. 2010-146215
Patent Document 2: Japanese Laid-open Patent Publication No. 10-177494

The above-mentioned technique, however, fails to reduce power consumption.

In the cluster storage device according to the above-mentioned technique, for example, when one node powers OFF functional units other than the disk device, the server becomes inaccessible to data stored in the node of which functional units have been powered OFF. For this reason, in the storage device, all the nodes power ON the functional units thereof even when the number of accesses to data is small and an input/output (I/O) load is low. This makes it impossible to reduce power consumed by the storage device.

SUMMARY

According to an aspect of an embodiment, a control device, which receives an access request to data stored in a memory device from an information processing device and controls access to the data, includes a selector, a changing unit, a notification unit, and a power supply controller. When the number of accesses to a memory device is out of a range of a predetermined threshold, the selector selects a piece of data from pieces of data controlled by the control device itself or another control device. The changing unit changes a control device for controlling access to the selected a piece of data. The notification unit notifies an information processing device of a control device after changed and the selected a piece of data to be controlled by the control device after changed. The power supply controller controls a power supply of the control device after changed or a power supply of a control device that has controlled access to the selected a piece of data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a table illustrating an example of a data structure that is stored in a logical volume management table;
FIG. 3 is a table illustrating an example of a data structure that is stored in a storage controller management table;
FIG. 4 is a table illustrating an example of the data structure that is stored in the logical volume management table.

DESCRIPTION OF EMBODIMENTS

Preferred embodiments of the present invention will be explained with reference to accompanying drawings. It is to be noted that the invention is not limited by the embodiments. The respective embodiments can be combined appropriately in the range where processing contents are consistent.

[a] First Embodiment

Figure 1:
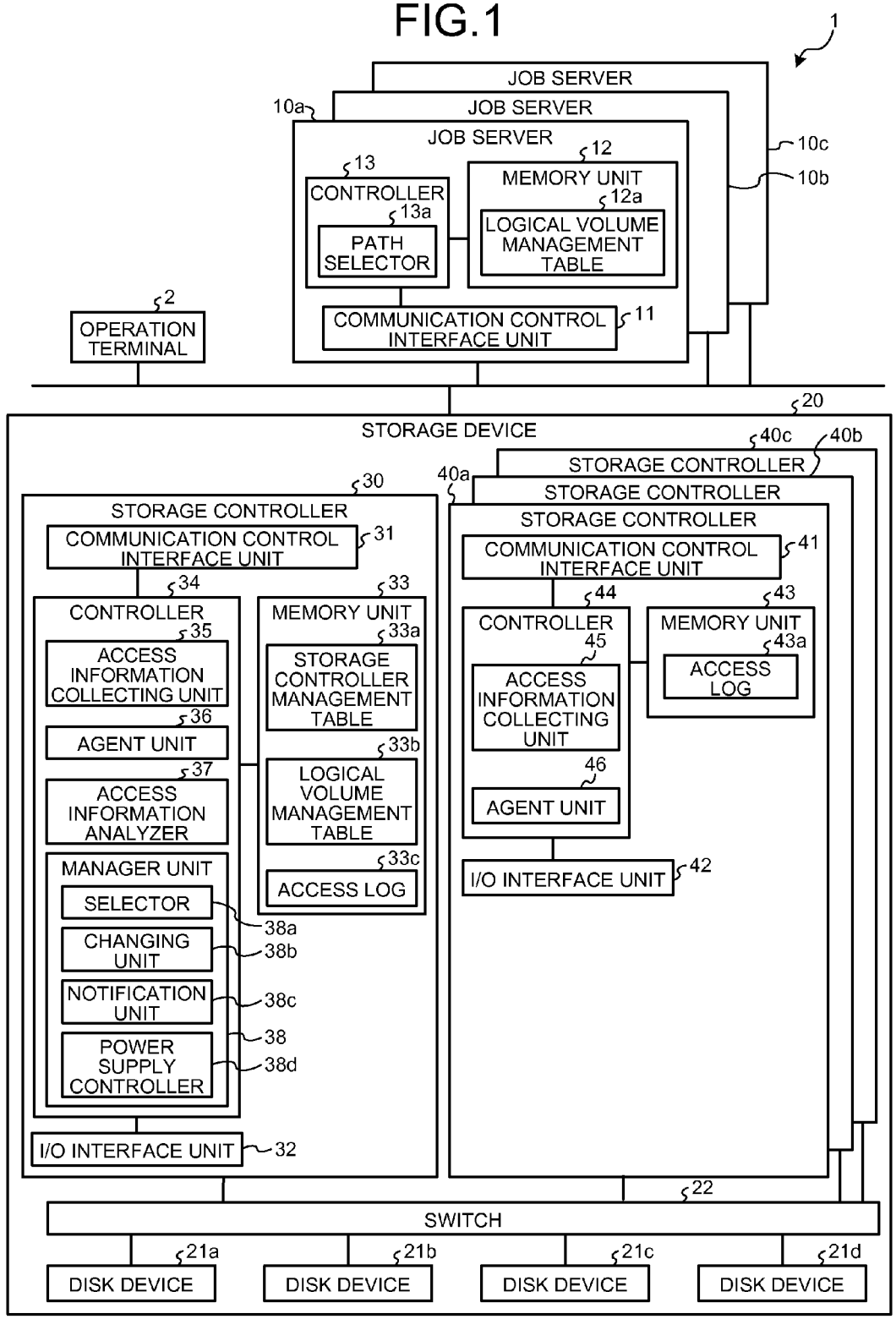
FIG. 1 is a diagram illustrating a configuration example of an information processing system according to a first embodiment.

Configuration of Information Processing System 1 According to First Embodiment FIG. 1 is a diagram illustrating a configuration example of an information processing system 1 according to a first embodiment. As illustrated in FIG. 1, the information processing system 1 according to the first embodiment includes an operation terminal 2, a job server 10a, a job server 10b, a job server 10c, and a storage device 20. In the following description, when the job server 10a, the job server 10b, and the job server 10c are not distinguished from one another, they are referred to as job server(s) 10.

In the information processing system 1 according to the first embodiment, the operation terminal 2, the job servers 10, and the storage device 20 are connected with an internet small computer system (iSCSI), for example, so as to communicate with one another. The number of operation terminals 2, the number of job servers 10, and the number of storage devices 20 that are included in the information processing system 1 according to the first embodiment are not limited to those as illustrated in FIG. 1.

The operation terminal 2 provides a graphical user interface (GUI) and receives various types of settings from a user. For example, the operation terminal 2 receives creation of a logical volume from the user and notifies a master storage controller, which will be described later, of the creation of the logical volume. Furthermore, the operation terminal 2 receives a direction to perform scale-out from the user and notifies the master storage controller, which will be described later, of start of the scale-out. It is to be noted that the scale-out indicates processing of additionally installing a disk device and a storage controller included in the storage device 20, which will be described later.

The job server 10 accesses to data on the logical volumes included in the storage device 20 to execute various pieces of job processing. The storage device 20 includes the disk devices to store various types of data.

Configuration of Job Server 10

The job server 10 includes a communication control interface unit 11, a memory unit 12, and a controller 13. The communication control interface unit 11 is an interface to the storage device 20 connected to the job server 10 through network or communication wires.

The memory unit 12 is a memory device such as a semiconductor memory element, for example, and includes a logical volume management table 12a. The logical volume management table 12a stores information indicating IP addresses of active paths of the logical volumes to be accessed. It is to be noted that a data structure of the logical volume management table 12a is described in detail later with reference to FIG. 2.

The controller 13 is an electronic circuit such as a central processing unit (CPU) and a micro processing unit (MPU) and executes various types of arithmetic processing. The controller 13 has a path selector 13a. When the job server 10 accesses to data in the logical volume stored in the storage device 20, the path selector 13a selects an active path by referring to the logical volume management table 12a.

Configuration of Storage Device 20

The storage device 20 includes a disk device 21a, a disk device 21b, a disk device 21c, a disk device 21d, and a switch 22. Furthermore, the storage device 20 includes a storage controller 30, a storage controller 40a, a storage controller 40b, and a storage controller 40c.

It is to be noted that the storage controller 40a, the storage controller 40b, and the storage controller 40c are referred to as storage controller(s) 40 appropriately while they are not distinguished from one another. The number of disk devices, the number of switches, and the number of storage controllers that are included in the storage device 20 are not limited to those as illustrated in FIG. 1. Furthermore, the power supplies of the storage controller 30 and the storage controllers 40 are controlled independently in the storage device 20.

The disk device 21a is a memory device that has a hard disk drive (HDD), for example, and stores data. The disk device 21b, the disk device 21c, and the disk device 21d are memory devices that have HDDs, for example, and store data like the disk device 21a. It is to be noted that when the disk device 21a to the disk device 21d are not distinguished from one another, they are referred to as disk device(s) 21.

The switch 22 connects the storage controller 30, the storage controllers 40, and the disk devices 21. The switch 22 enables all the storage controllers to be accessible to all the disk devices 21.

The storage controller 30 receives access to data in the logical volume from the job server 10 and controls the received access to the data in the logical volume. Furthermore, the storage controller 30 manages the storage device 20 overall. In the following description, the storage controller 30 is referred to as the "master storage controller" appropriately.

The storage controller 40 receives access to data in the logical volume from the job server 10 and controls the received access to the data in the logical volume.

Functional Configuration of Storage Controller 30

As illustrated in FIG. 1, the storage controller 30 includes a communication control interface unit 31, an I/O interface unit 32, a memory unit 33, and a controller 34. The communication control interface unit 31 is an interface to the operation terminal 2, the job server 10, and the storage controller 40 that are connected to the storage controller 30 through network or communication wires. The I/O interface unit 32 is an interface to the disk devices 21 and controls I/O to/from the disk devices 21.

The memory unit 33 is a memory device such as a semiconductor memory element, for example, and includes a storage controller management table 33a, a logical volume management table 33b, and an access log 33c.

The storage controller management table 33a stores states of the storage controllers included in the storage device 20, IP addresses assigned to the storage controllers, and information indicating logical volumes allocated to the storage controllers for control. It is to be noted that a data structure of the storage controller management table 33a will be described later with reference to FIG. 3.

The logical volume management table 33b stores states of logical volumes and information indicating storage controllers that are active paths for the logical volumes for the respective logical volumes. It is to be noted that a data structure of the logical volume management table 33b will be described later with reference to FIG. 4.

The access log 33c stores access information indicating access patterns for the respective logical volumes. For example, the access log 33c stores, as the access information, access dates, IP addresses of the job servers 10 as the access sources, identifiers of the logical volumes as the access destinations, and data amounts.

The controller 34 is an electronic circuit such as a CPU and an MPU, for example, and includes an access information collecting unit 35, an agent unit 36, an access information analyzer 37, and a manager unit 38.

The access information collecting unit 35 collects the access information in the respective storage controllers when I/O is performed on the storage device 20 from the job server 10. For example, the access information collecting unit 35 collects, as the access information, the access date, the IP address of the job server 10 as the access source, the identifier of the logical volume as the access destination, and the data amount. The access information collecting unit 35 stores the collected access information in the access log 33c.

The agent unit 36 executes creation of a logical volume and deletion of a logical volume when notified from the manager unit 38. When the agent unit 36 has finished the creation of the logical volume or the deletion of the logical volume, the agent unit 36 notifies the manager unit 38 of the finish of the processing. Furthermore, the agent unit 36 executes I/O control requested from the job server 10.

The access information analyzer 37 analyzes the collected access information. The access information analyzer 37 checks an access mount to the disk devices 21 overall after having waited for a constant period of time. Then, when the number of accesses is out of a range of a predetermined threshold, the access information analyzer 37 notifies the manager unit 38 of it.

For example, the access information analyzer 37 determines whether the data amount per unit time is out of the range of the predetermined threshold. The access information analyzer 37 determines whether a usage amount of a network bandwidth for the access data amount is out of the range of the predetermined threshold, for example. For example, the range of the predetermined threshold is "50% to 70%". It is to be noted that the range of the predetermined threshold is not limited to "50% to 70%" and can be changed.

The manager unit 38 has a selector 38a, a changing unit 38b, a notification unit 38c, and a power supply controller 38d. The manager unit 38 manages the storage device 20 overall when it has been notified of a fact that the number of accesses to the disk devices 21 is out of the range of the predetermined threshold from the access information analyzer 37.

The manager unit 38 manages the storage device 20 overall when it has been directed to start the scale-out from the operation terminal 2.

When the number of accesses to the disk devices 21 is out of the range of the predetermined threshold, the selector 38a selects, as a change source, data in any logical volume from the data in the logical volumes controlled by the storage controller 30 or other storage controllers 40. Then, the selector 38a notifies the changing unit 38b of the selected data in the logical volume.

For example, the selector 38a executes the following processing when it has been notified of the fact that the number of accesses to the disk devices 21 is smaller than the range of the predetermined threshold from the access information analyzer 37. That is to say, the selector 38a determines a storage controller to be stopped among the storage controller 30 or other storage controllers 40. For example, the selector 38a determines a storage controller to which the number of accesses is small among the storage controller 30 or other storage controllers 40 to be the storage controller to be stopped. Then, the selector 38a selects, as the change source, the data in the logical volume that is controlled by the storage controller to be stopped by referring to the storage controller management table 33a. It is to be noted that the selector 38a notifies the power supply controller 38d of the storage controller to be stopped.

On the other hand, the selector 38a executes the following processing when it has been notified of the fact that the number of accesses to the disk devices 21 is larger than the range of the predetermined threshold from the access information analyzer 37. That is to say, the selector 38a selects, as the change source, data in any logical volume from data in the logical volumes to be controlled by the storage controller 30 or other storage controllers 40 by referring to the logical volume management table 33b.

In addition, the selector 38a executes the following processing when it has been directed to start the scale-out from the operation terminal 2, in other words, when the number of accesses to the disk devices 21 is larger than the range of the predetermined threshold and a storage controller is installed additionally. That is to say, the selector 38a selects, as the change source, data in any logical volume from data in the logical volumes controlled by the storage controller 30 or other storage controllers 40 by referring to the logical volume management table 33b.

When the number of accesses to the disk devices 21 is out of the range of the predetermined threshold, the changing unit 38b changes the storage controller for controlling access to the data in the logical volume that has been selected by the selector 38a so as to change an active path of the logical volume.

For example, the changing unit 38b executes the following processing when it has been notified of the fact that the number of accesses to the disk devices 21 is smaller than the range of the predetermined threshold from the access information analyzer 37. That is to say, the changing unit 38b selects, as the change destination, a storage controller that has been powered ON by the power supply controller 38d as the storage controller for controlling access to the data in the logical volume that has been selected by the selector 38a.

For example, the changing unit 38b executes the following processing when it has been notified of the fact that the number of accesses to the disk devices 21 is larger than the range of the predetermined threshold from the access information analyzer 37. That is to say, the changing unit 38b selects, as the change destination, a storage controller other than the storage controller to be stopped as the controller for controlling access to the data in the logical volume that has been selected by the selector 38a. It is to be noted that in this case, the changing unit 38b selects an arbitrary storage controller. Then, the changing unit 38b determines whether the logical volume selected by the selector 38a can be moved to the selected storage controller based on past access trends by referring to the access log 33c indicating the access patterns for the respective logical volumes. Then, the changing unit 38b determines the selected storage controller to the change destination when the logical volume selected by the selector 38a can be moved thereto.

When the changing unit 38b has been directed to start the scale-out from the operation terminal 2, the changing unit 38b selects, as the change destination, the additionally-installed storage controller as the controller for controlling access to the data in the logical volume that has been selected by the selector 38a.

The changing unit 38b notifies an agent unit included in the storage controller selected as the change destination so as to create the logical volume selected by the selector 38a. In addition, the changing unit 38b notifies an agent unit included in the storage controller as the changed destination so as to delete the logical volume selected by the selector 38a. In this manner, the changing unit 38b changes the active path of the logical volume.

The notification unit 38c notifies the job server 10 of the storage controller after changed and the data of the logical volume to be controlled by the storage controller after changed. With this, the job server 10 stops access to the logical volume as the change target.

The notification unit 38c notifies the job server 10 of the fact that the changing unit 38b has changed the active path of the logical volume completely. With this, the job server 10 restarts access to the logical volume with the active path after changed.

Furthermore, the notification unit 38c notifies the job server 10 of the storage controller to be stopped that has been determined by the selector 38a. With this, the job server 10 sets a "path state" corresponding to the storage controller to be stopped to "off-line" on the logical volume management table 12a.

When the notification unit 38c has been directed to start the scale-out from the operation terminal 2, the notification unit 38c notifies the job server 10 of addition of a new storage controller. With this, the job server 10 sets a "path ID address" corresponding to the storage controller to be added and sets the "path state" thereof to "stand-by" on the logical volume management table 12a.

When the number of accesses to the disk devices 21 is out of the range of the predetermined threshold, the power supply controller 38d controls the power supply of the storage controller after changed or the power supply of the storage controller before changed. For example, when the power supply controller 38d has been notified of the fact that the number of accesses to the disk devices 21 is larger than the range of the predetermined threshold from the access information analyzer 37, the power supply controller 38d powers ON the storage controller that is being stopped.

For example, when the power supply controller 38d has been notified of the fact that the number of accesses to the disk devices 21 is smaller than the range of the predetermined threshold from the access information analyzer 37, the power supply controller 38d powers OFF the storage controller to be stopped that has been determined by the selector 38a.

When the power supply controller 38d has been directed to start the scale-out from the operation terminal 2, the power supply controller 38d powers ON the additionally-installed storage controller.

Functional Configuration of Storage Controller 40

The storage controller 40 includes a communication control interface unit 41, an I/O interface unit 42, a memory unit 43, and a controller 44. The function of the communication control interface unit 41 is similar to the function of the communication control interface unit 31. The function of the I/O interface unit 42 is similar to the function of the I/O interface unit 32.

The memory unit 43 is a memory device such as a semiconductor memory element, for example, and includes an access log 43a. It is to be noted that a data structure stored in the access log 43a is similar to the data structure stored in the access log 33c.

The controller 44 is an electronic circuit such as a CPU and an MPU, for example, and includes an access information collecting unit 45 and an agent unit 46. The function of the access information collecting unit 45 is similar to the function of the access information collecting unit 35 and the function of the agent unit 46 is similar to the function of the agent unit 36.

Data Structure Stored in Logical Volume Management Table 12a

Next, an example of the data structure stored in the logical volume management table 12a is described with reference to FIG. 2. FIG. 2 is a table illustrating an example of the data structure stored in the logical volume management table 12a.

As illustrated in FIG. 2, the logical volume management table 12a stores information in which "logical volume IDs", "path IP addresses", and "path states" are made to correspond to one another. Note that the "logical volume ID" stored in the logical volume management table 12a indicates an identifier of a logical volume. For example, a value of a "logical volume A", or a "logical volume B" is stored as the "logical volume ID".

The "path IP address" stored in the logical volume management table 12a indicates an IP address of a path. For example, a value of "10.20.40.50", "10.20.40.51", or the like is stored as the "path IP address".

The "path state" stored in the logical volume management table 12a indicates a type of a path state. For example, a value of "active" indicating that a path is being operated, "stand-by" indicating that the path is in a stand-by state, "off-line" indicating that the path is stopped, or the like is stored as the "path state".

In the example as illustrated in FIG. 2, the logical volume management table 12a indicates that the IP address of the active path of the logical volume A is "10.20.40.50". The logical volume management table 12a also indicates that there is no active path of the logical volume B and paths of which IP addresses are "10.20.40.50", "10.20.40.51", and "10.20.40.52" are stand-by paths.

Data Structure Stored in Storage Controller Management Table 33a

Next, an example of the data structure stored in the storage controller management table 33a is described with reference to FIG. 3. FIG. 3 is a table illustrating the example of the data structure stored in the storage controller management table 33a. It is to be noted that the storage controller management table 33a is generated by the manager unit 38 when the storage device is powered ON.

As illustrated in FIG. 3, the storage controller management table 33a stores information in which "storage controller IDs", "storage controller states", "assigned IP addresses" and "allocated logical volume IDs" are made to correspond to one another. Note that the "storage controller ID" stored in the storage controller management table 33a indicates an identifier of a storage controller. For example, a value of "1", "2", or the like is stored as the "storage controller ID".

The "storage controller state" stored in the storage controller management table 33a indicates whether the type of the storage controller state is being operated or is being stopped. For example, "active" indicating that the storage controller is being operated or "stop" indicating that the storage controller is being stopped is stored as the "storage controller state".

The "assigned IP address" stored in the storage controller management table 33a indicates an IP address assigned to a storage controller. For example, a value of "10.20.40.50", "10.20.40.51", or the like is stored as the "assigned IP address".

The "allocated logical volume ID" stored in the storage controller management table 33a indicates an identifier of a logical volume to be controlled by the storage controller. In other words, the "allocated logical volume ID" indicates a logical volume of which storage controllers is the active path. For example, a value of a "logical volume A", a "logical volume B", or the like is stored as the "allocated logical volume ID".

In the example as illustrated in FIG. 3, the storage controller management table 33a indicates that the storage controller "1" to which the IP address "10.20.40.50" is assigned is being operated and corresponds to an active path of the logical volume A and the logical volume D. The storage controller management table 33a also indicates that the storage controller "2" to which the IP address "10.20.40.51" is assigned is being operated and corresponds to an active path of the logical volume B and the logical volume E.

The "storage controller state" in the information stored in the storage controller management table 33a is updated by the power supply controller 38d and the "allocated logical volume ID" therein is updated by the changing unit 38b.

Data Structure Stored in Logical Volume Management Table 33b

Next, an example of the data structure stored in the logical volume management table 33b is described with reference to FIG. 4. FIG. 4 is a table illustrating the example of the data structure stored in the logical volume management table 33b.

As illustrated in FIG. 4, the logical volume management table 33b stores information in which "logical volume IDs", "logical volume states", "allocated storage controller IDs" and "IP addresses of assigned job servers" are made to correspond to one another. Note that the "logical volume ID" stored in the logical volume management table 33b indicates an identifier of a logical volume. For example, a value of a "logical volume A", a "logical volume B", or the like is stored as the "logical volume ID".

The "logical volume state" stored in the logical volume management table 33b indicates a type of a logical volume state. For example, a value of "normal" indicating that the logical volume is normal, "creating" indicating that the logical volume is being created, or "deleting" indicating that the logical volume is being deleted is stored as the "logical volume state". When the "logical volume state" is the "creating", the logical volume is being moved from another storage controller. Furthermore, when the "logical volume state" is the "deleting", the logical volume is being moved to another storage controller. When the logical volume is not normal, "error" is stored as the "logical volume state" stored in the logical volume management table 33b.

Furthermore, the "allocated storage controller ID" stored in the logical volume management table 33b indicates an identifier of a storage controller that is an active path for the logical volume. For example, a value of "1", "2", or the like is stored as the allocated storage controller ID".

The "assigned job server IP address" stored in the logical volume management table 33b indicates an IP address assigned to the job server. For example, a value of "10.20.30.40", "10.20.30.41", or the like is stored as the "assigned job server IP address".

In the example as illustrated in FIG. 4, the logical volume management table 33b indicates that the logical volume A is normal, the storage controller "1" is an active path, and an access is received from the job server 10 of which IP address is "10.20.30.40". The logical volume management table 33b also indicates that the logical volume B is being deleted, the storage controller "2" is an active path, and an access is received from the job server 10 of which IP address is "10.20.30.40".

It is to be noted that the "logical volume state", the "allocated storage controller ID" and the "assigned job server IP address" in the information stored in the logical volume management table 33b are updated by the changing unit 38b.

Active Paths in Information Processing System 1

Next, an example of active paths in the information processing system 1 is described with reference to FIG. 5 to FIG. 7. An example of active paths in the normal state is described with reference to FIG. 5, an example of active paths when the I/O amount is larger than the range of the predetermined threshold is described with reference to FIG. 6, and an example of active paths when the I/O amount is smaller than the range of the predetermined threshold is described with reference to FIG. 7.

Active Paths in Normal State

Figure 5:
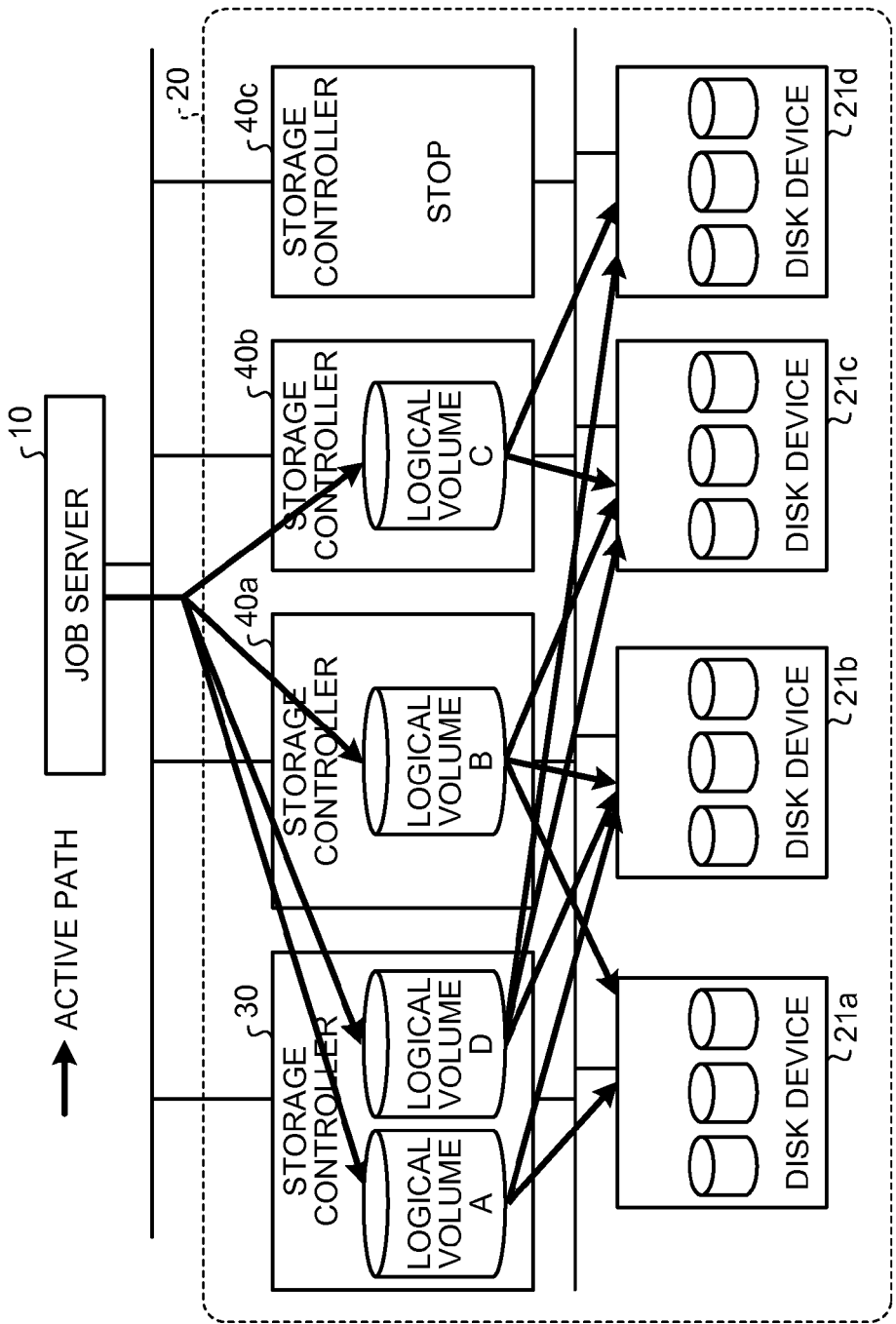
FIG. 5 is a diagram illustrating an example of active paths in the normal state.

FIG. 5 is a diagram illustrating the example of the active paths in the normal state. As illustrated in FIG. 5, in the storage device 20, the storage controller 30 is an active path of the logical volume A and the logical volume D. The storage controller 40a is an active path of the logical volume B and the storage controller 40b is an active path of the logical volume C. It is to be noted that in the example as illustrated in FIG. 5, the storage controller 40c is being stopped.

Active Paths when I/O Amount is Larger than Range of Threshold

Figure 6:
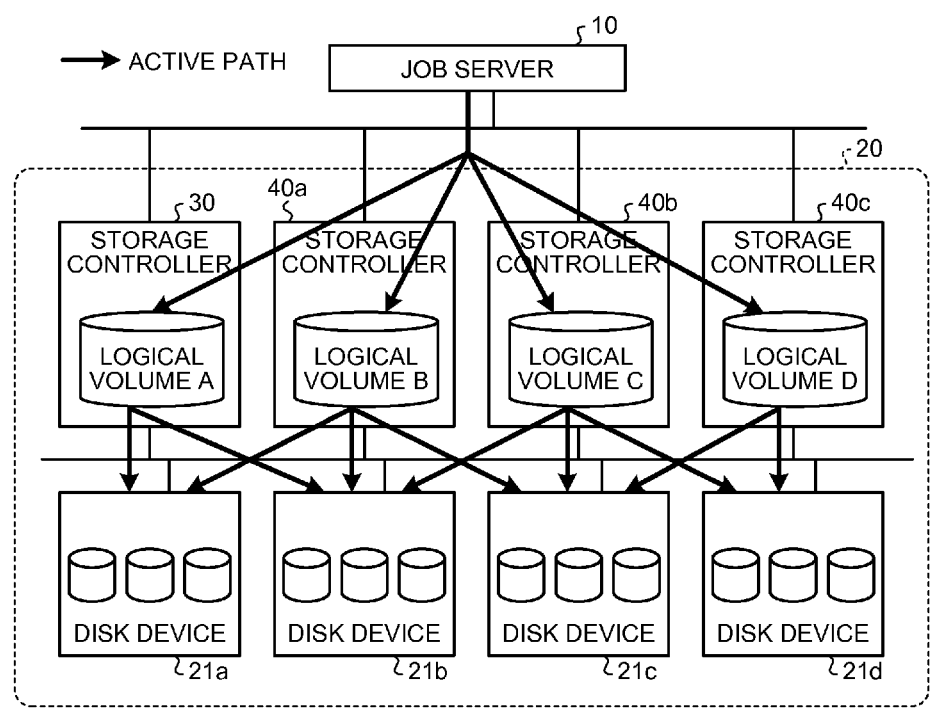
FIG. 6 is a diagram illustrating an example of active paths when an I/O amount is larger than a threshold.

FIG. 6 is a diagram illustrating the example of the active paths when the I/O amount is larger than the threshold. FIG. 6 illustrates the case when the I/O amount is larger than the range of the threshold from the active paths in the normal state as illustrated in FIG. 5. In this case, the master storage controller 30 powers ON the storage controller 40c. Then, the master storage controller 30 selects a logical volume D controlled by itself and changes the storage controller 40c to be an active path of the logical volume D.

Active Paths when I/O Amount is Smaller than Range of Threshold

Figure 7:
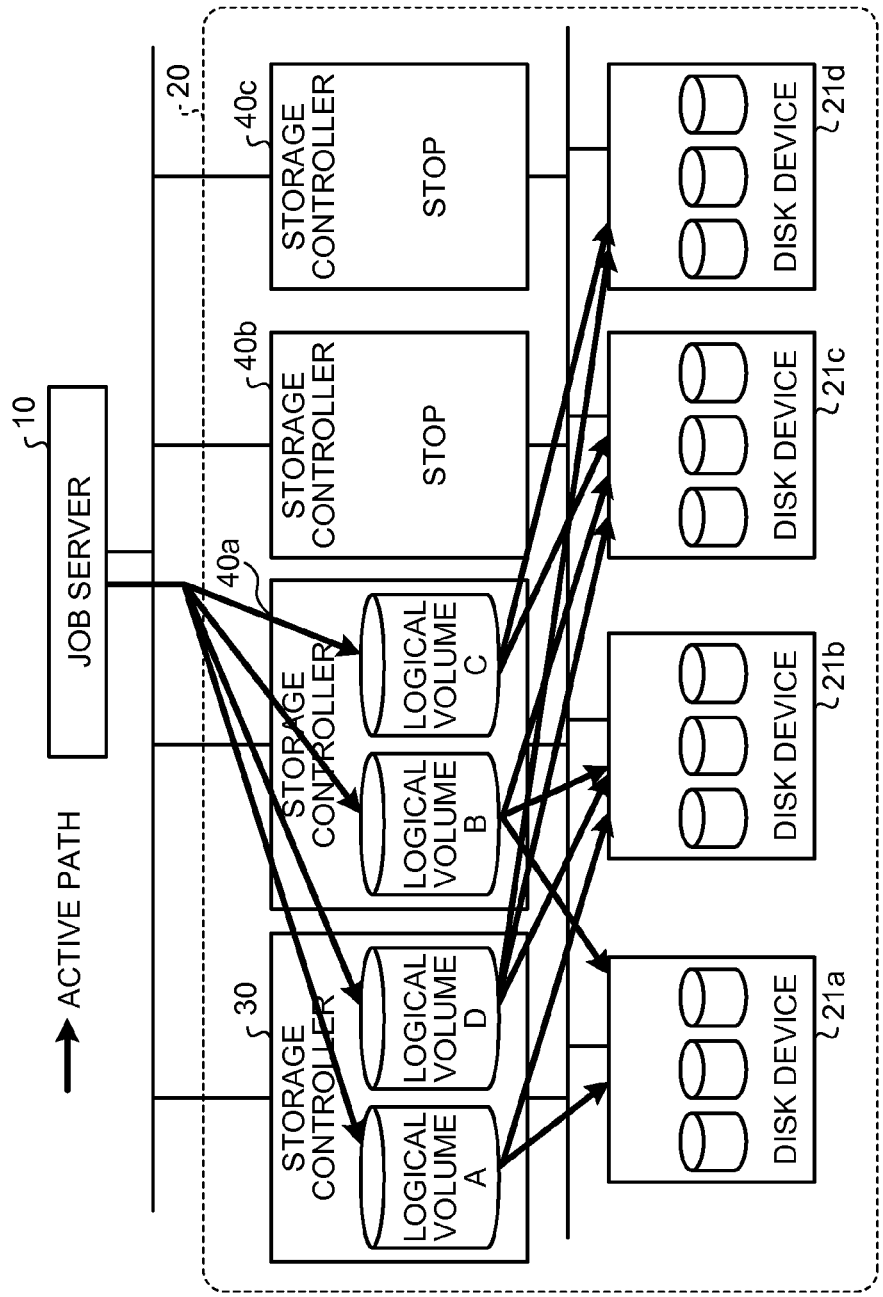
FIG. 7 is a diagram illustrating an example of active paths when the I/O amount is smaller than the threshold.

FIG. 7 is a diagram illustrating the example of the active paths when the I/O amount is smaller than the threshold. FIG. 7 illustrates the case where the I/O amount is smaller than the range of the threshold from the active paths in the normal state as illustrated in FIG. 5. In this case, the master storage controller 30 determines to stop the storage controller 40b, for example. Furthermore, the master storage controller 30 changes the active path of the logical volume C controlled by the storage controller 40b to the storage controller 40a. Then, the master storage controller 30 powers OFF the storage controller 40b.

Processing Operations in Information Processing System 1

Processing operations in the information processing system 1 are described with reference to FIG. 8 to FIG. 10. The processing operations when the I/O amount is smaller than the threshold are described with reference to FIG. 8, the processing operations when the I/O amount is larger than the threshold are described with reference to FIG. 9, and the processing operations at the time of the scale-out are described with reference to FIG. 10.

Processing Operations when I/O Amount is Smaller than Range of Threshold

Figure 8:
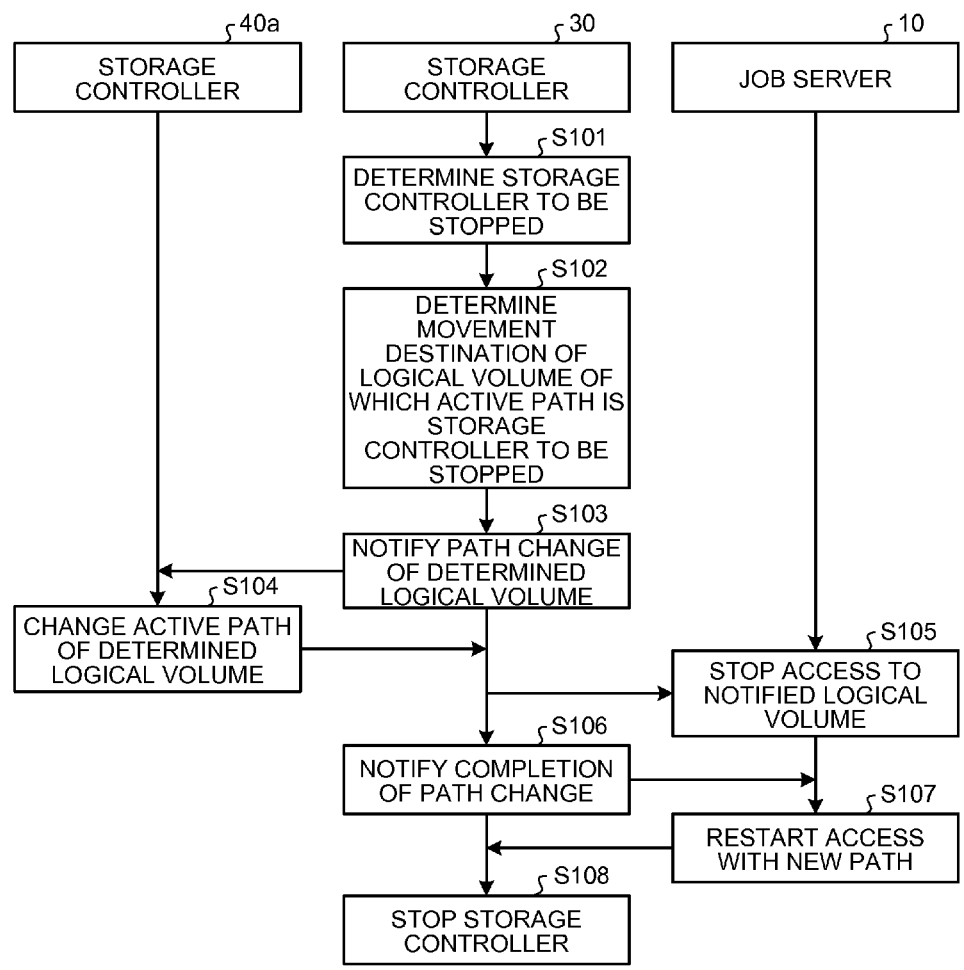
FIG. 8 is a sequence diagram illustrating processing operations when the I/O amount is smaller than the threshold.

FIG. 8 is a sequence diagram illustrating the processing operations when the I/O amount is smaller than the threshold. FIG. 8 illustrates the processing operations when the active paths in the normal state as illustrated in FIG. 5 are changed to the active paths as illustrated in FIG. 7.

As illustrated in FIG. 8, when the storage controller 30 determines that the I/O amount is smaller than the range of the threshold, the storage controller 30 determines a storage controller to be stopped (step S101). For example, the storage controller 30 determines to stop the storage controller 40b.

Subsequently, the storage controller 30 determines a movement destination of the logical volume C of which active path is the storage controller 40b to be stopped (step S102). Then, the storage controller 30 notifies the storage controller 40a of the path change of the determined logical volume C (step S103).

The storage controller 40a changes the active path of the determined logical volume C (step S104). Subsequently, when the storage controller 40a has notified the storage controller 30 of the fact that the active path of the logical volume C has been changed, the storage controller 30 notifies the job server 10 of the path change of the determined logical volume C. Then, the job server 10 stops access to the notified logical volume C (step S105).

The storage controller 30 notifies the job server 10 of completion of the path change (step S106). With this, the job server 10 restarts access to the logical volume C with a new path (step S107). That is to say, the job server 10 requests the storage controller 40a to access to the logical volume C. The storage controller 30 stops the storage controller 40b (step S108).

Processing Operations when I/O Amount is Larger than Range of Threshold

Figure 9:
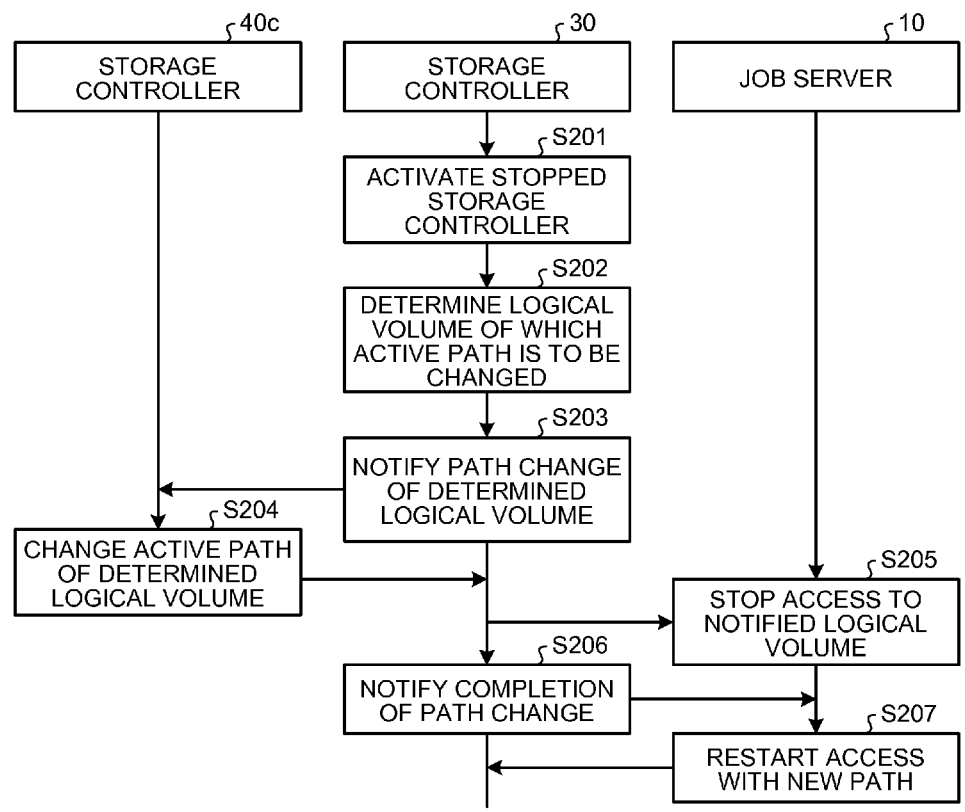
FIG. 9 is a sequence diagram illustrating processing operations when the I/O amount is larger than the threshold.

FIG. 9 is a sequence diagram illustrating the processing operations when the I/O amount is larger than the threshold. FIG. 9 illustrates the processing operations when the active paths in the normal state as illustrated in FIG. 5 are changed to the active paths as illustrated in FIG. 6.

As illustrated in FIG. 9, when the storage controller 30 determines that the I/O amount is larger than the range of the threshold, the storage controller 30 activates the stopped storage controller (step S201). For example, the storage controller 30 activates the stopped storage controller 40c.

Subsequently, the storage controller 30 determines a logical volume of which active path is to be changed (step S202). For example, the storage controller 30 selects a logical volume D. Then, the storage controller 30 notifies the storage controller 40c of the path change of the determined logical volume D (step S203).

The storage controller 40c changes the active path of the determined logical volume D (step S204). Subsequently, when the storage controller 40c has notified the storage controller 30 of the fact that the active path of the logical volume D has been changed, the storage controller 30 notifies the job server 10 of the path change of the determined logical volume D. Then, the job server 10 stops access to the notified logical volume C (step S205).

The storage controller 30 notifies the job server 10 of the completion of the path change (step S206). With this, the job server 10 restarts access to the logical volume D with a new path (step S207). That is to say, the job server 10 requests the storage controller 40c to access to the logical volume D.

Processing Operations at the Time of Scale-Out

Figure 10:
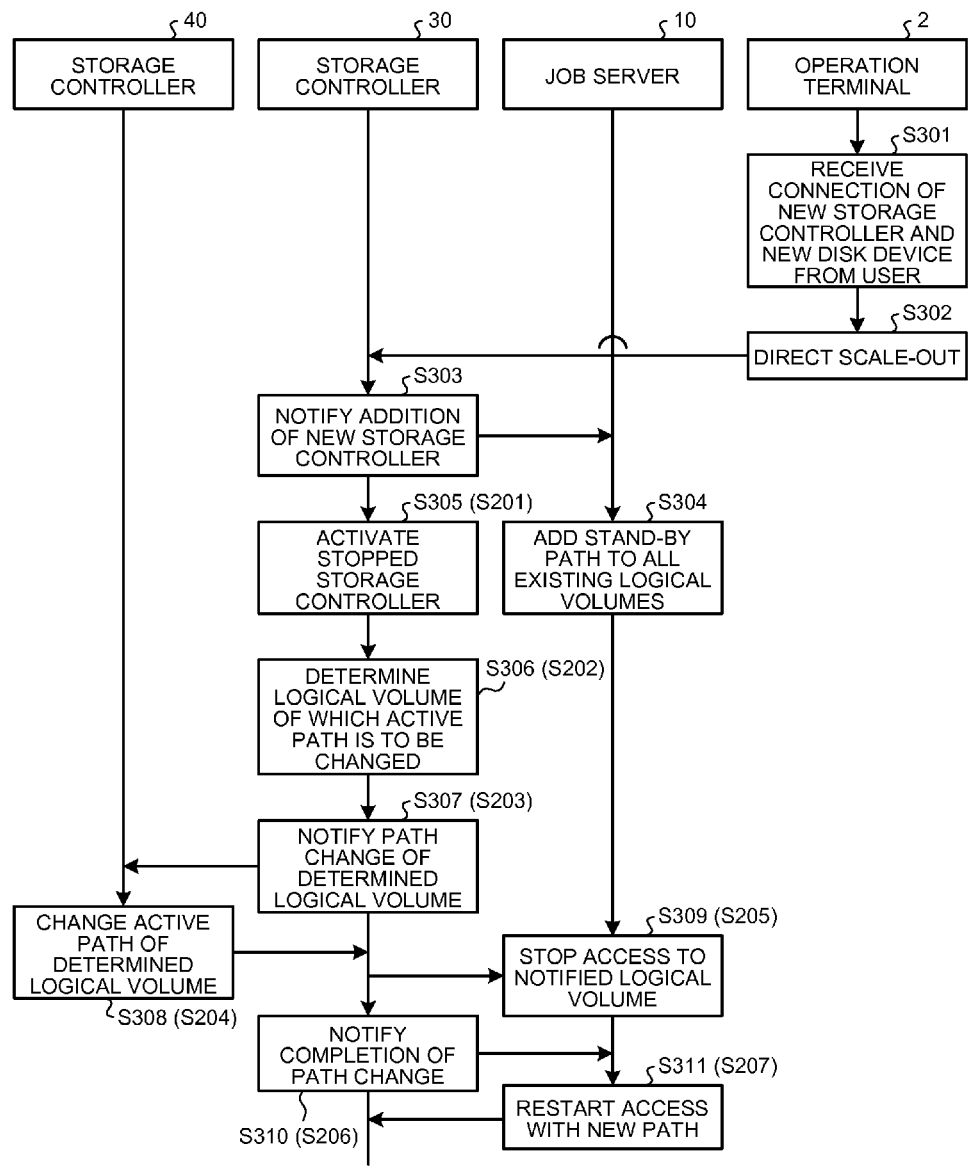
FIG. 10 is a sequence diagram illustrating processing operations at the time of scale-out.

FIG. 10 is a sequence diagram illustrating the processing operations at the time of the scale-out. As illustrated in FIG. 10, the operation terminal 2 receives connection of a new storage controller and a new disk device from a user (step S301). Subsequently, the operation terminal 2 directs the storage controller 30 to perform scale-out (step S302).

The storage controller 30 notifies the job server 10 of addition of a new storage controller (step S303). The job server 10 adds stand-by paths to all the existing logical volumes (step S304). That is to say, the job server 10 stores an IP address assigned to the new storage controller as the "path IP address" so as to correspond to each "logical volume ID" and stores standby as the "path state" in the logical volume management table 12a.

It is to be noted that pieces of subsequent processing to be executed in the information processing system 1 are the same as the pieces of processing at step S202 to step S207 as illustrated in FIG. 9.

Processing Procedures of Processing in Information Processing System 1

Next, processing procedures of processing in the information processing system 1 are described with reference to FIG. 11 and FIG. 12. Path change processing by the manager unit 38 is described with reference to FIG. 11, and processing when the job server 10 receives a notification is described with reference to FIG. 12.

Path Changing Processing by Manager Unit 38

Figure 11:
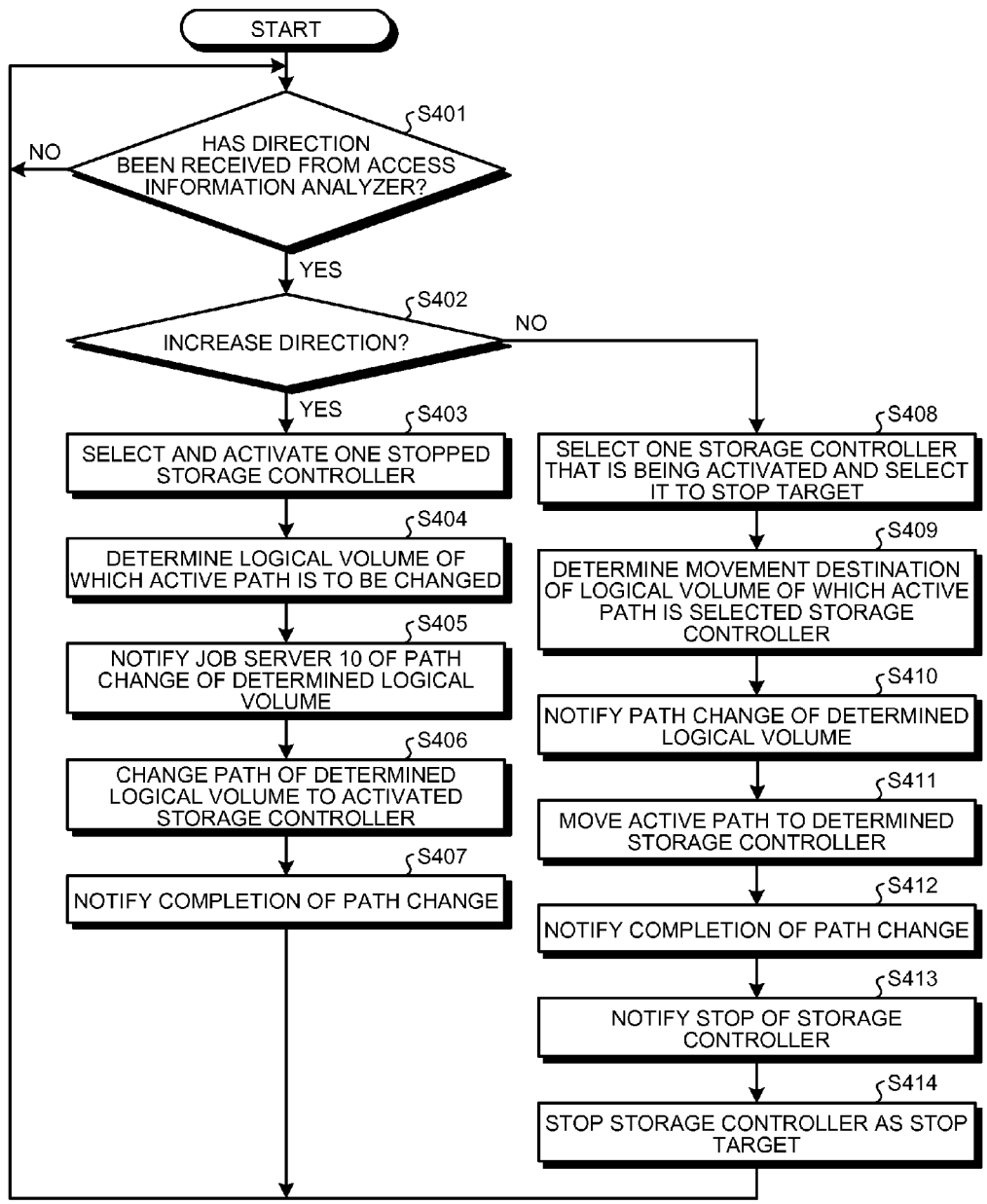
FIG. 11 is a flowchart illustrating processing procedures of path change processing by a manager unit.

FIG. 11 is a flowchart illustrating the processing procedures of the path change processing by the manager unit 38. As illustrated in FIG. 11, each part included in the manager unit 38 determines whether it has received a direction from the access information analyzer 37 (step S401). When each part included in the manager unit 38 has determined that it has received a direction from the access information analyzer 37 (Yes at step S401), each part determines whether the direction is an increase direction (step S402). On the other hand, when each part included in the manager unit 38 has determined that it has not received a direction from the access information analyzer 37 (No at step S401), each part determines whether it has received a direction from the access information analyzer 37 after a predetermined period of time has passed.

When each part included in the manager unit 38 has determined that the direction is the increase direction (Yes at step S402), the power supply controller 38d selects one stopped storage controller and activates it (step S403). Then, the selector 38a determines a logical volume of which active path is to be changed (step S404).

Subsequently, the notification unit 38c notifies the job server 10 of the path change of the determined logical volume (step S405). Then, the changing unit 38b changes the path of the determined logical volume to the activated storage controller (step S406). Subsequently, the notification unit 38c notifies the job server 10 of completion of the path change (step S407).

On the other hand, when each part included in the manager unit 38 has determined that the direction is not the increase direction (No at step S402), the selector 38a selects one storage controller that is being activated and selects it to a target to be stopped (step S408). Then, the changing unit 38b determines a movement destination of a logical volume of which active path is the storage controller selected by the selector 38a (step S409).

The notification unit 38c notifies the job server 10 of the path change of the determined logical volume (step S410). Then, the changing unit 38b moves the active path to the determined storage controller (step S411).

Subsequently, the notification unit 38c notifies the job server 10 of the completion of the path change (step S412). Then, the notification unit 38c notifies the job server 10 of stop of the storage controller (step S413). Thereafter, the power supply controller 38d stops the storage controller as the target to be stopped (step S414).

Processing when Job Server 10 Receives Notification

Figure 12:
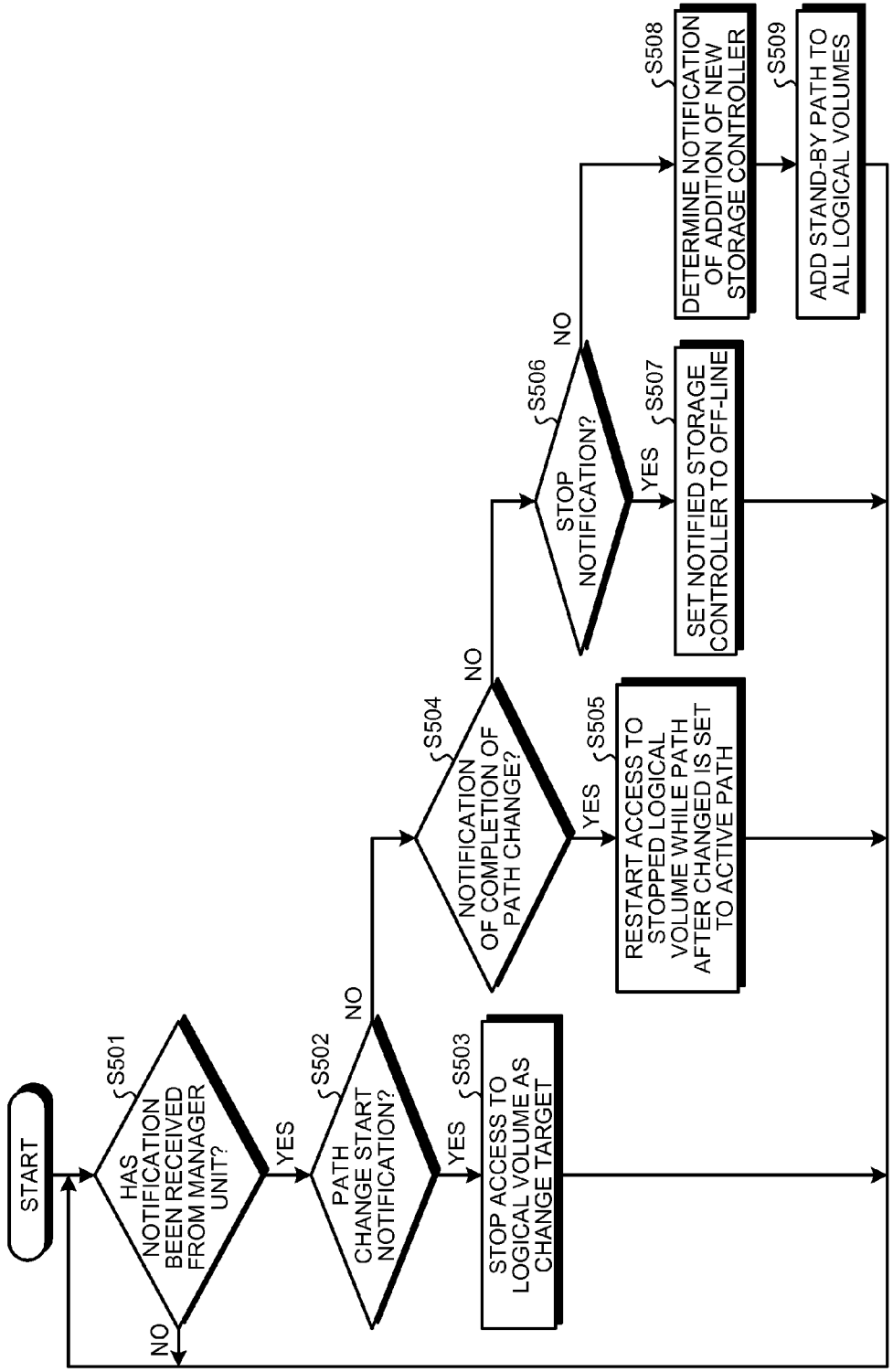
FIG. 12 is a flowchart illustrating processing procedures of processing when a job server receives a notification.

FIG. 12 is a flowchart illustrating the processing procedures when the job server 10 receives a notification. As illustrated in FIG. 12, the job server 10 determines whether it has received a notification from the manager unit 38 (step S501). When the job server 10 has determined that it has not received a notification from the manager unit 38 (No at step S501), the job server 10 determines whether it has received a notification from the manager unit 38 after a predetermined period of time has passed.

On the other hand, when the job server 10 has determined that it has received a notification from the manager unit 38 (Yes at step S501), the job server 10 determines whether the received notification is a notification of path change (step S502). When the job server 10 has determined that the received notification is a notification of path change (Yes at step S502), the job server 10 stops access to the logical volume as the change target (step S503).

On the other hand, when the job server 10 has determined that the received notification is not a notification of path change (No at step S502), the job server 10 determines whether the received notification is a notification of completion of path change (step S504). When the job server 10 has determined that the received notification is a notification of completion of path change (Yes at step S504), the job server 10 restarts access to the stopped logical volume while which the path after changed is set to the active path (step S505).

On the other hand, when the job server 10 has determined that the received notification is not a notification of completion of path change (No at step S504), the job server 10 determines whether the received notification is a stop notification (step S506). When the job server 10 has determined that the job server 10 received notification is a stop notification (Yes at step S506), the job server 10 sets the notified storage controller to off-line (step S507).

On the other hand, when the job server 10 has determined that the received notification is not a stop notification (No at step S506), the job server 10 determines that the received notification is a notification of addition of a new storage controller (step S508). Then, the job server 10 adds stand-by paths to all the existing logical volumes (step S509).

It is to be noted that after the step S503, the step S505, the step S507, and the step S509, the job server 10 shifts to the step S501.

Effects of First Embodiment

As described above, in the first embodiment, in the scale-out-type storage device 20 including the disk devices 21 and the storage controllers, the disk devices 21 and the storage controllers are connected to one another with the switch 22. This makes all the storage controllers be accessible to all the disk devices 21.

Furthermore, the power supplies of the storage controller 30 and the storage controllers 40 are controlled independently in the storage device 20. This makes it possible to stop the storage controller only in the storage device 20.

When the access amount is smaller than the range of the predetermined threshold and the storage controller is stopped, the storage device 20 notifies the job server 10 of the stopped storage controller. When the access amount is larger than the range of the predetermined threshold and the storage controller is activated, the storage device 20 notifies the job server 10 of the activated storage controller. This enables the job server 10 to switch the active path during I/O.

In this manner, the storage device 20 can change the number of storage controllers to be operated when it can be operated with the small number of storage controllers. In other words, the storage device 20 can operate the minimum number of storage controllers only in accordance with a data access amount from the job server 10. As a result, the storage device 20 powers OFF the storage controllers that are not operated so as to reduce a system operation electric power amount and $CO_2$.

In the above-mentioned first embodiment, the storage controllers 40a to 40c have configurations different from that of the storage controller 30 for the convenience of explanation. The invention is not, however, limited thereto and the storage controllers 40a to 40c may have the same configuration as that of the storage controller 30.

[b] Second Embodiment

The invention may be carried out in various different forms other than the above-mentioned embodiment. In a second embodiment, other examples included in the invention are described.

System Configuration and Others

All or a part of the pieces of processing that have been described to be executed automatically among the respective pieces of processing described in the embodiment can be performed manually. Alternatively, all or a part of the pieces of processing that have been described to be executed manually can be performed automatically with a well-known method. In addition, processing procedures, control procedures, and specific technical terms in the above-mentioned description and drawings can be changed arbitrarily unless otherwise specified.

In addition, orders of the processing at the respective steps in the respective pieces of processing described in the embodiments may be changed depending on various loads and usage conditions.

The invention can be also applied in a cluster storage device including a plurality of storage devices in which disk devices and storage controllers are stored in the same housing by controlling the power supplies of the disk devices and the power supplies of the storage controllers separately.

The constituent components as illustrated in the drawings are functionally conceptual and are not limited to be configured as illustrated in the drawings physically. For example, the selector 38a and the changing unit 38b may be integrated in the manager unit 38. In addition, all or an arbitrary part of the processing functions in the respective devices may be made to operate with a CPU and programs to be analyzed and executed on the CPU, or may be executed as hardware with a wired logic.

The aspect of the invention makes it possible to reduce power consumption.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device that receives an access request to data stored in a memory device from an information processing device and controls access to the data, the control device comprising:
    a selector that selects a piece of data, access to which is controlled by a first control device to be stopped, from pieces of data controlled by the control device or another control device when the number of accesses to the memory device is smaller than a predetermined range;
    a changing unit that changes a control device for controlling access to the selected piece of data from the first control device to be stopped to a second control device;
    a notification unit that notifies the information processing device of the second control device and the selected piece of data to be controlled by the second control device, and
    a power supply controller that controls a power supply of the first control device to power OFF the first control device.

2. The control device according to claim 1, wherein the power supply controller powers ON the second control device that is being stopped when the number of accesses to the memory device is larger than the predetermined range, and
    the changing unit changes the control device for controlling access to the selected piece of data to the powered ON second control device.

3. The control device according to claim 1, wherein the power supply controller powers ON an additional control device when the number of accesses to the memory device is larger than the predetermined range and the additional control device has been installed additionally, and
    the changing unit changes the control device for controlling access to the selected piece of data to the additional control device.

4. A storage device comprising:
    a memory device, and
    a plurality of control devices each of which receives an access request to data stored in the memory device from an information processing device and controls access to the data, wherein
    one of the control devices includes:
        a selector that selects a piece of data, access to which is controlled by a first control device to be stopped, from pieces of data controlled by the one of the control device or another control device when the number of accesses to the memory device is smaller than a predetermined range, a changing unit that changes a control device for controlling access to the selected piece of data from the first control device to be stopped to a second control device, a notification unit that notifies the information processing device of the second control device and the selected piece of data to be controlled by the second control device, and a power supply controller that controls a power supply of the first control device to power OFF the first control device.

5. The storage device according to claim 4, wherein the power supply controller powers ON the second control device that is being stopped when the number of accesses to the memory device is larger than the predetermined range, and the changing unit changes the control device for controlling access to the selected piece of data to the powered ON second control device.

6. The storage device according to claim 4, wherein the power supply controller powers ON an additional control device when the number of accesses to the memory device is larger than the predetermined range and the additional control device has been installed additionally, and the changing unit changes the control device for controlling access to the selected piece of data to the additional control device.

7. A control method performed by a control device that receives an access request to data stored in a memory device from an information processing device and controls access to the data, the control method comprising:

selecting a piece of data, access to which is controlled by a first control device to be stopped, from pieces of data controlled by the control device or another control device when the number of accesses to the memory device is smaller than a predetermined range;

changing a control device for controlling access to the selected piece of data from the first control device to be stopped to a second control device;

notifying the information processing device of the second control device and the selected piece of data to be controlled by the second control device, and controlling a power supply of the first control device to power OFF the first control device.

8. The control method performed by the control device according to claim 7, wherein the controlling of the power supply includes powering ON the second control device that is being stopped when the number of accesses to the memory device is larger than the predetermined range, and the changing includes changing the control device for controlling access to the selected piece of data to the powered ON second control device.

9. The control method performed by the control device according to claim 7, wherein the controlling of the power supply includes powering ON an additional control device when the number of accesses to the memory device is larger than the predetermined range and the additional control device has been installed additionally, and the changing includes changing the control device for controlling access to the selected piece of data to the additional control device.

\* \* \* \* \*